US009561702B2

(12) United States Patent
Clemence et al.

(10) Patent No.: US 9,561,702 B2
(45) Date of Patent: Feb. 7, 2017

(54) THREE DOOR STRUCTURE FOR PARTIAL RECIRCULATION IN AN AIR CONDITIONING SYSTEM (71) Applicant: Denso International America, Inc., Southfield, MI (US)

(72) Inventors: Andrew Clemence, Royal Oak, MI (US); Gregory Thompson, Ortonville, MI (US); Raymond Bailey, South Lyon, MI (US); Melissa Buczek, Orion, MI (US)

(73) Assignee: Denso International America, Inc., Southfield, MI (US)

( * ) Notice: Subject to any disclaimer, the term of this patent is extended or adjusted under 35 U.S.C. 154(b) by 601 days.

(21) Appl. No.: 14/013,127

(22) Filed: Aug. 29, 2013

(65) Prior Publication Data
US 2014/0065943 A1 Mar. 6, 2014

Related U.S. Application Data (60) Provisional application No. 61/694,967, filed on Aug. 30, 2012.

(51) Int. Cl.
*B60H 1/00* (2006.01)
*B60H 1/24* (2006.01)

(52) U.S. Cl.
CPC ...... *B60H 1/00021* (2013.01); *B60H 1/00849* (2013.01); *B60H 1/24* (2013.01); *B60H 2001/00085* (2013.01)

(58) Field of Classification Search
CPC .......... F24F 3/0522; F24F 13/04; F24F 13/16; F24F 7/007; G05D 23/138; B60H 1/00021; B60H 1/00028; B60H 1/00849; B60H 1/24; B60H 2001/00085
USPC ................ 454/139, 155, 265, 141, 143, 145
See application file for complete search history.

(56) References Cited

U.S. PATENT DOCUMENTS

| 5,699,960 | A | 12/1997 | Kato et al. |
| 6,371,202 | B1 | 4/2002 | Takano et al. |
| 6,758,739 | B1* | 7/2004 | Sangwan ............... B60H 1/008 454/139 |
| 6,958,009 | B2* | 10/2005 | Shindou ............. B60H 1/00028 454/121 |
| 7,357,176 | B2 | 4/2008 | Yelles |
| 2002/0025772 | A1* | 2/2002 | Egami ................ B60H 1/00849 454/121 |
| 2007/0218824 | A1* | 9/2007 | Bailey ................ B60H 1/00564 454/139 |
| 2009/0013706 | A1* | 1/2009 | Sato ................... B60H 1/00664 62/239 |

* cited by examiner

*Primary Examiner* — Gregory Huson
*Assistant Examiner* — Dana Tighe
(74) *Attorney, Agent, or Firm* — Harness, Dickey & Pierce, P.L.C.

(57) ABSTRACT

A heating, ventilation and air conditioning system includes a blower unit that has an interior air intake and an exterior air intake. Three doors are moved between open and closed positions to define a recirculation mode, a fresh mode and a partial recirculation mode. As the doors move between their open and closed positions, a variable partial mode and a variable fresh mode are defined.

8 Claims, 8 Drawing Sheets

THREE DOOR STRUCTURE FOR PARTIAL RECIRCULATION IN AN AIR CONDITIONING SYSTEM

CROSS-REFERENCE TO RELATED APPLICATIONS

This application claims the benefit of U.S. Provisional Application No. 61/694,967, filed on Aug. 30, 2012. The entire disclosure of the above application is incorporated herein by reference.

FIELD

The present disclosure relates to a vehicle Heating Ventilation and Air Conditioning (HVAC) system. More particularly, the present disclosure relates to a three door structure for partial recirculation in the HVAC system.

BACKGROUND

This section provides background information related to the present disclosure which is not necessarily prior art.

Vehicles are known to incorporate HVAC systems to improve the comfort of the people within the passenger compartment of the vehicle. The HVAC systems heat and cool air blown through the HVAC system using a heating heat exchanger and/or a cooling heat exchanger. The heating heat exchanger typically utilizes the engine coolant as a source of heat for heating the air. The cooling heat exchanger is typically an evaporator which is part of an air conditioning system in the vehicle powered by the engine of the vehicle. The air blown through the HVAC system comes from air outside the vehicle, air inside the passenger compartment of the vehicle or a combination of the air outside the vehicle and the air inside the passenger compartment of the vehicle. The air being blown through the HVAC system is conditioned (heated/cooled) and is then directed into the passenger compartment of the vehicle through one or more outlet vents.

Although these vehicle HVAC systems have worked for their intended purposes, some disadvantages remain. For instance, these HVAC systems typically include an exterior air intake vent through which air from outside the vehicle enters the HVAC system. These HVAC systems also typically include an interior air intake vent through which air from inside the vehicle enters the HVAC system. In the "mixture" configuration where air from the exterior air intake vent and air from the interior air intake vent are mixed, both the exterior air intake vent and the interior air intake vent are open.

One disadvantage of the typical air intake systems of the present day is the packaging size required for the dual intake system for air from outside the vehicle and air from inside the vehicle. In addition, these present day systems typically only allow for three specific control or intake modes. These three modes are fresh mode where only air from outside the vehicle is used, partial recirculation mode where both air from outside the vehicle and air from inside the vehicle is used and recirculation mode where only air from inside the vehicle is used. During the partial recirculation mode where both air from outside the vehicle and air from inside the vehicle is used, there is a problem with air from the outside of the vehicle being able to enter the passenger compartment by bypassing the HVAC system.

SUMMARY

This section provides a general summary of the disclosure, and is not a comprehensive disclosure of its full scope or all of its features.

The present disclosure provides a solution to the disadvantages described above, specifically the bypass disadvantage. The present disclosure utilizes three "butterfly" doors to counter these disadvantages. The three "butterfly" doors allow for the partial recirculation mode function in a smaller packaging footprint. In addition, the three "butterfly" doors provide not only the fresh mode, the partial recirculation mode and the recirculation mode, the three "butterfly" door concept also provides a RAM air control which is a variable fresh concept which maintains the airflow amount as vehicle speed increases and a variable partial recirculation mode.

In utilizing the three "butterfly" doors, along with the associated linkage design, the disclosure can allow the use of multiple modes including the fresh mode, the partial recirculation mode, the recirculation mode with the added function of RAM air control. RAM air control allows an increased user operation range while the doors move from the fresh mode to an off position. The three "butterfly" door system allows the user to control the fresh and recirculation amount while preventing fresh air from bypassing the blower and thus the entire HVAC system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
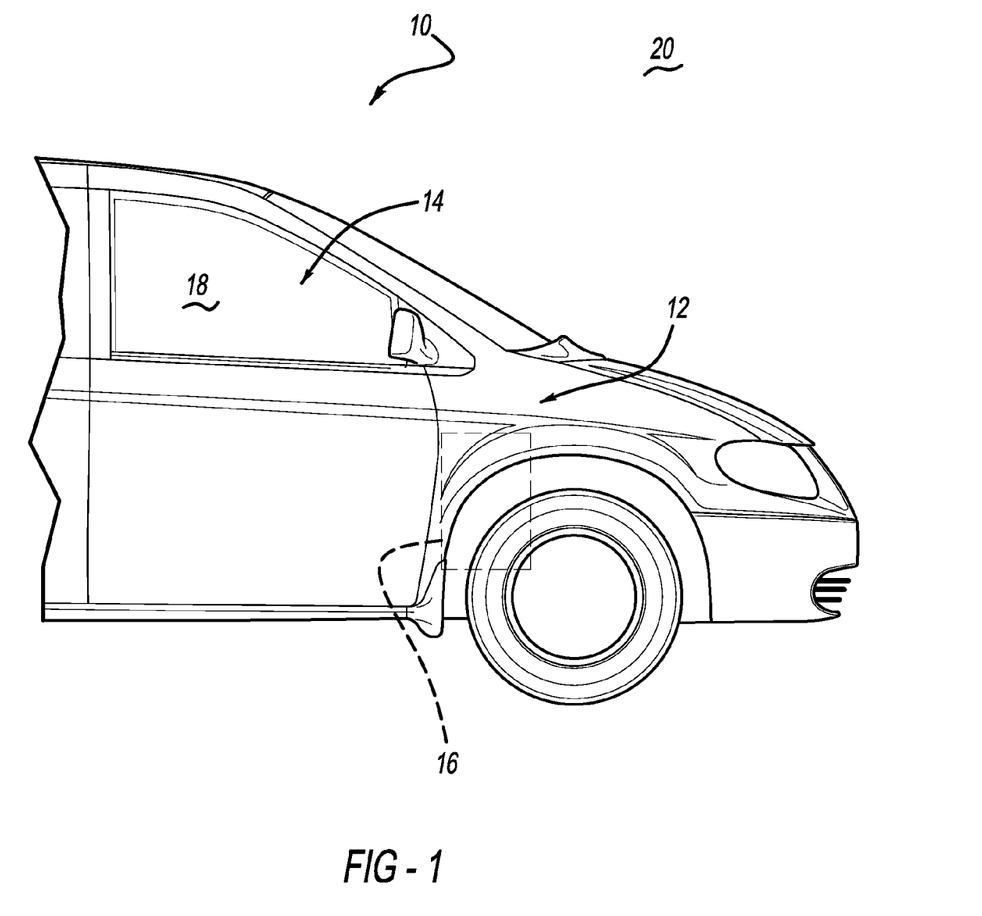
FIG. 1 is a side view of a vehicle with an HVAC system schematically illustrated therein.

Referring initially to FIG. 1, a vehicle 10 is illustrated. The vehicle 10 includes an engine compartment generally indicated at 12. The vehicle 10 also includes a passenger compartment 14. A heating, venting, and air conditioning (HVAC) unit 16 is included within the passenger compartment 14 as schematically illustrated in FIG. 1. The passenger compartment 14 defines an interior space 18 within the passenger compartment 14 and an exterior space 20 outside the passenger compartment 14. The HVAC unit 16 heats and/or cools air within the interior space 18 of the passenger compartment 14 in a known manner.

Figure 2:
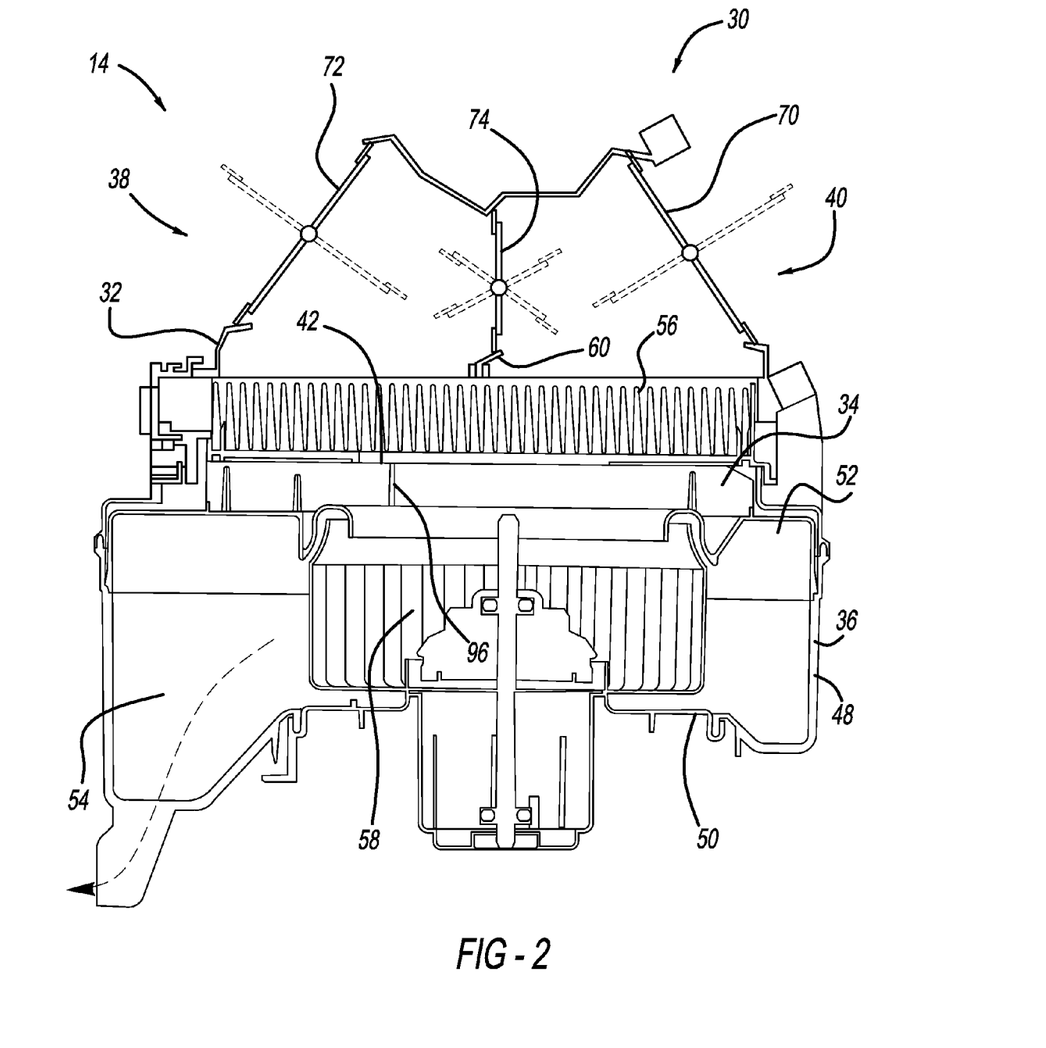
FIG. 2 is a sectional view of a blower unit of the HVAC system of FIG. 1.
Figure 3:
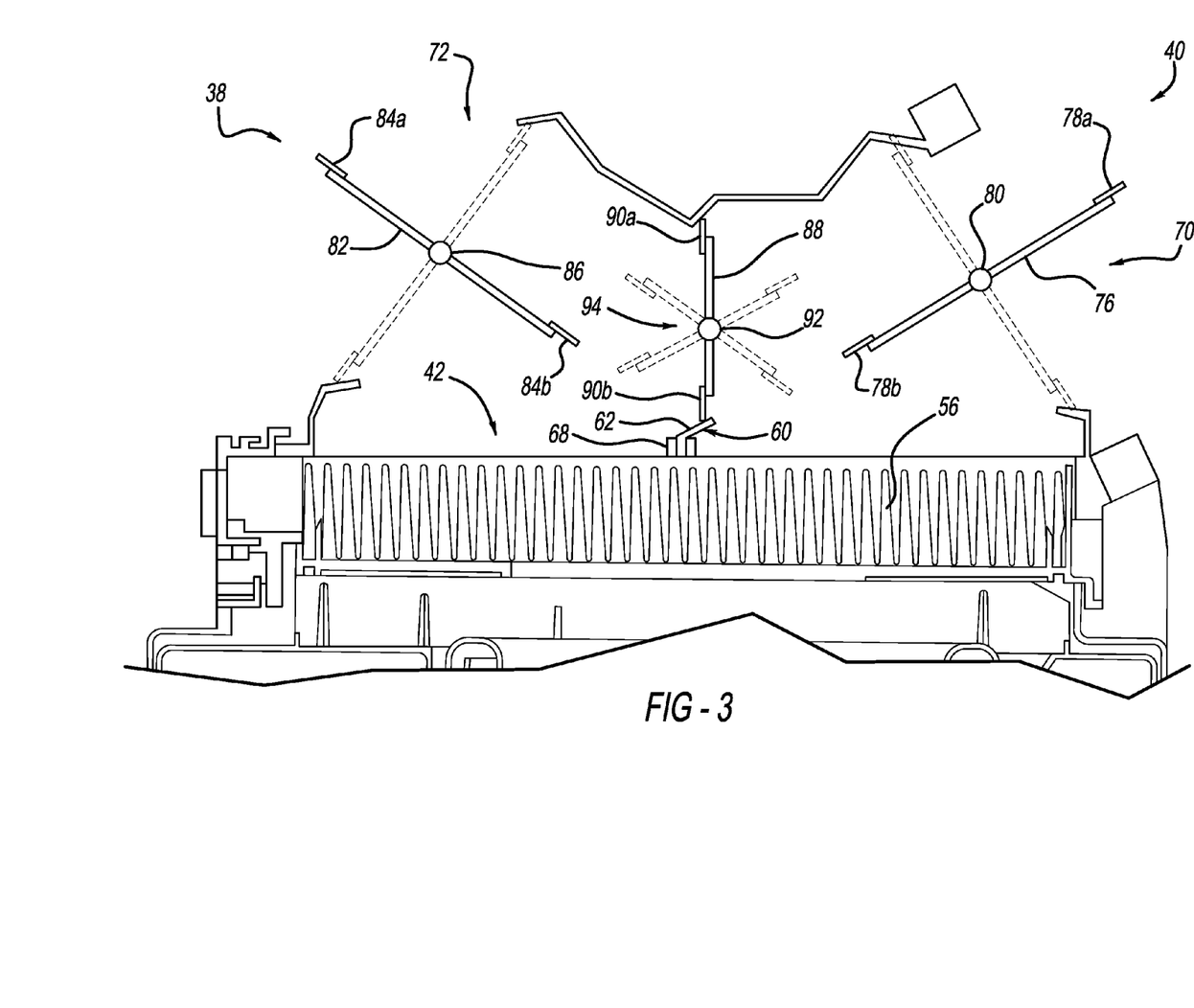
FIG. 3 is a sectional view of the blower unit of the HVAC system of FIG. 2.
Figure 4:
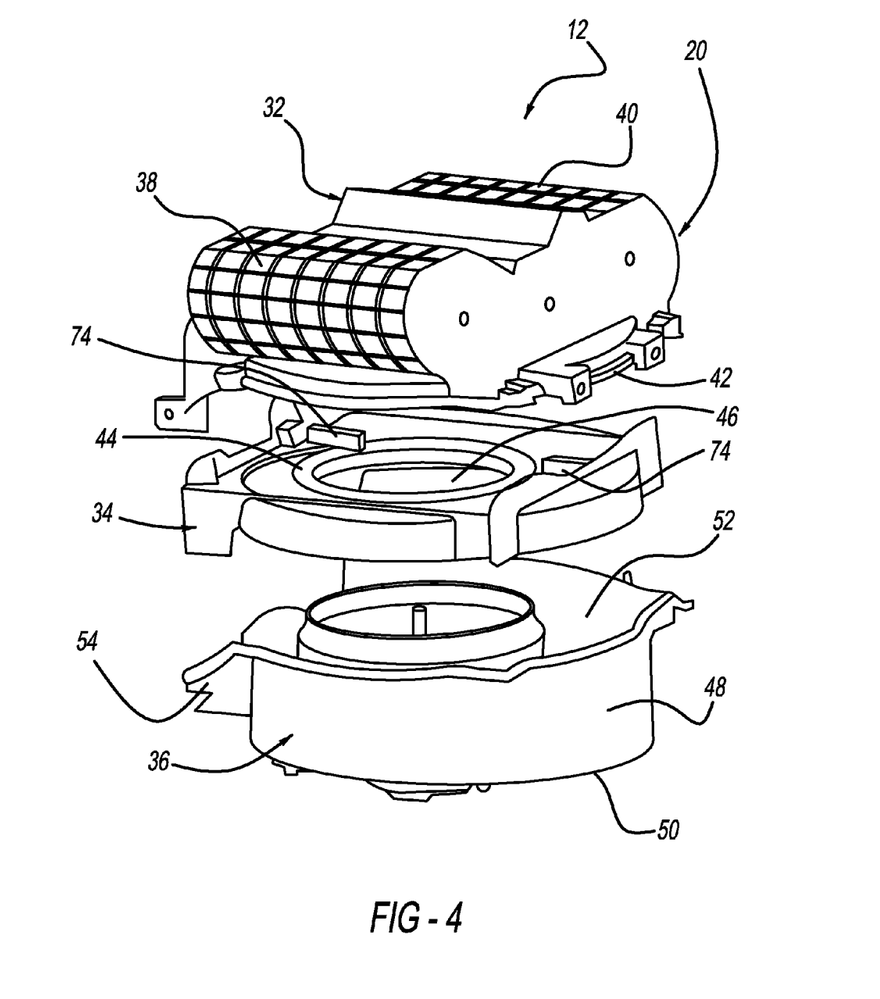
FIG. 4 is an exploded view of the blower unit of the HVAC system of FIG. 2.

Referring now to FIGS. 2, 3 and 4, a blower unit 30 of the HVAC unit 16 is illustrated. In general, the blower unit 30 draws in air from the interior space 18 and/or the exterior space 20, and the blower unit 30 moves the air through a heating heat exchanger (not shown) and/or a cooling heat exchanger (not shown) such that the air can be heated and/or cooled as is well known in the art. Once the air is heated/cooled, the air moves into the interior space 18 for the comfort of the passengers. FIG. 2 illustrates the blower unit 30 in an off mode.

As shown in FIGS. 2 and 4, the blower unit 30 generally includes an upper case member 32, a bellmouth member 34, and a lower case member 36. The bellmouth member 34 is disposed between and coupled to the upper case member 32 and the lower case member 36. The upper case member 32, bellmouth member 34, and lower case member 36 can be coupled in any suitable manner. In one embodiment, the upper case member 32, the bellmouth member 34, and the lower case member 36 are each made out of a rigid plastic material. Also, in one embodiment, the upper case member 32, the bellmouth member 34, and the lower case member 36 are manufactured individually by molding processes.

The upper case member 32 is generally hollow and defines an interior air intake aperture 38 as shown in FIGS. 2 and 4. The interior air intake aperture 38 is in fluid communication with the interior space 18 of the passenger compartment 14 of the vehicle 10. As such, air from the interior space 18 is able to enter the blower unit 30 through the interior air intake aperture 38. The upper case member 32 also defines an exterior air intake aperture 40. The exterior air intake aperture 40 is in fluid communication with the exterior space 20 outside of the vehicle 10. As such, air from the exterior space 20 is able to enter the blower unit 30 through the exterior air intake aperture 40. The upper case member 32 further includes a lower opening 42. The lower opening 42 is in fluid communication with the bellmouth member 34.

The bellmouth member 34 is generally flat and ring-shaped as shown in FIG. 4. The bellmouth member 34 includes an upper surface 44, and the bellmouth member 34 also defines a central aperture 46.

The lower case member 36 generally includes an outer wall 48 and a lower wall 50. The outer wall 48 defines an open top end 52, and the bellmouth member 34 substantially covers the top end 52 of the lower case member 36. The lower case member 36 also includes an exhaust chamber 54. The exhaust chamber 54 is in fluid communication with a heating heat exchanger (not shown) and/or a cooling heat exchanger (not shown). As such, air through the blower unit 30 can exit the blower unit 30 through the exhaust chamber 54 to be heated and/or cooled.

As shown in FIGS. 2 and 3, the blower unit 30 also includes a filter 56. The filter 56 is supported by the upper case member 32 adjacent the lower opening 42 and substantially covers the lower opening 42. As such, dust and any other particulate matter is filtered out of the air as it passes from the upper case member 32 to the bellmouth member 34.

The blower unit 30 further includes a fan 58. The fan 58 can be of any suitable type. In the embodiment shown in FIGS. 2 and 4, the fan 58 is disposed within the lower case member 36. The fan 58 is operable to draw air into the blower unit 30 through the exterior air intake aperture 40 and/or the interior air intake aperture 38.

More specifically, operation of the fan 58 can cause air to enter the blower unit 30 through the exterior air intake aperture 40 and/or the interior air intake aperture 38. That air then moves through the filter 56, and any particulate matter is filtered out. Next, the air moves through the lower opening 42 of the upper case member 32 and then through the central aperture 46 of the bellmouth member 34. The fan 58 draws the air into the lower case member 36, and then the fan 58 pushes the air out the exhaust chamber 54 toward the heating heat exchanger or the cooling heat exchanger (not shown).

The blower unit 30 further includes a sealing member 60 as shown in FIGS. 2 and 3. The sealing member 60 includes a main body portion 62, which is generally thin and flat and axially straight. The main body portion 62 is disposed within the upper case member 32 near the lower opening 42. The main body portion 62 is integrally attached at both ends to the upper case member 32 in one embodiment. Also, in the embodiment shown, the main body portion 62 is oriented generally perpendicular to the upper surface 44 of the bellmouth member 34. Furthermore, in one embodiment, the main body portion 62 is made out of a hard plastic and is integrally attached through a molding process. As shown in FIGS. 2 and 3, the sealing member 60 further includes a compressible member 68. The compressible member 68 is typically made out of a compressible material, such as foam or an elastomer. The compressible member 68 is attached to the main body portion 62 at an end opposite to filter 56. As shown, a portion of the compressible member 68 may compress due to the abutment of the filter 56 to thereby create a seal between the sealing member 60 and the filter 56. As such, air is unlikely to pass between the sealing member 60 and the filter 56.

As shown in FIG. 2, the blower unit 30 further includes a first door 70, a second door 72 and a third door 74. In the embodiment shown, while the first, second and third doors 70, 72, 74 are each generally flat and axially straight and rotate around a center of the door, the disclosure is not limited to this style of door and any type of door known in the art may function in the disclosed HVAC system. These types of doors are referred to as "butterfly" doors. The first door 70 includes a core member 76 and a compressible member 78a, 78b, coupled on opposite ends of the core member 76. In one embodiment, the core member 76 is made of a hard plastic, and the compressible members 78a, 78b are typically made out of foam or an elastomer. The first door 70 is movably coupled to the upper case member 32. In the embodiment shown, for instance, the first door 70 is pivotally coupled to the upper case member 32 by at least one pin 80. Thus, as shown in FIG. 2, the first door 70 is able to pivot about the pin 80 to open and close the exterior air intake aperture 40.

The second door 72 is largely similar to the first door 70. More specifically, the second door 72 includes a core member 82 made out of hard plastic and collapsible members 84a, 84b typically made out of foam or an elastomer and coupled to the core member 82 on opposite ends. Also, the second door 72 is movably coupled to the upper case member 32. More specifically, the second door 72 is pivotally attached to the upper case member 32 by at least one pin 86. Thus, the second door 72 is able to pivot about the pin 86 to open and close the interior air intake aperture 38.

The third door 74 is largely similar to the first and second doors 70, 72. More specifically, the third door 74 includes a core member 88 made out of hard plastic and collapsible members 90a, 90b typically made out of foam or an elastomer and coupled to the core member 88 on opposite sides. Also, the third door 74 is movably coupled to the upper case member 32. More specifically, the third door 74 is pivotally attached to the upper case member 32 by at least one pin 92. Thus, the third door 74 is able to pivot about the pin 92 to open and close an air passage 94 which extends between exterior air intake aperture 40 and interior air intake aperture 38. Air passage 94 also extends between first door 70 and second door 72.

The first, second and third doors 70, 72, 74 can move independent of each other. The first, second and third doors 70, 72, 74 can be actuated about the respective pins 80, 86, 92 in any suitable manner, such as by using one or more motors. A linkage system may be incorporated to pivot one or more of the first, second and third doors 70, 72, 74.

Figure 5:
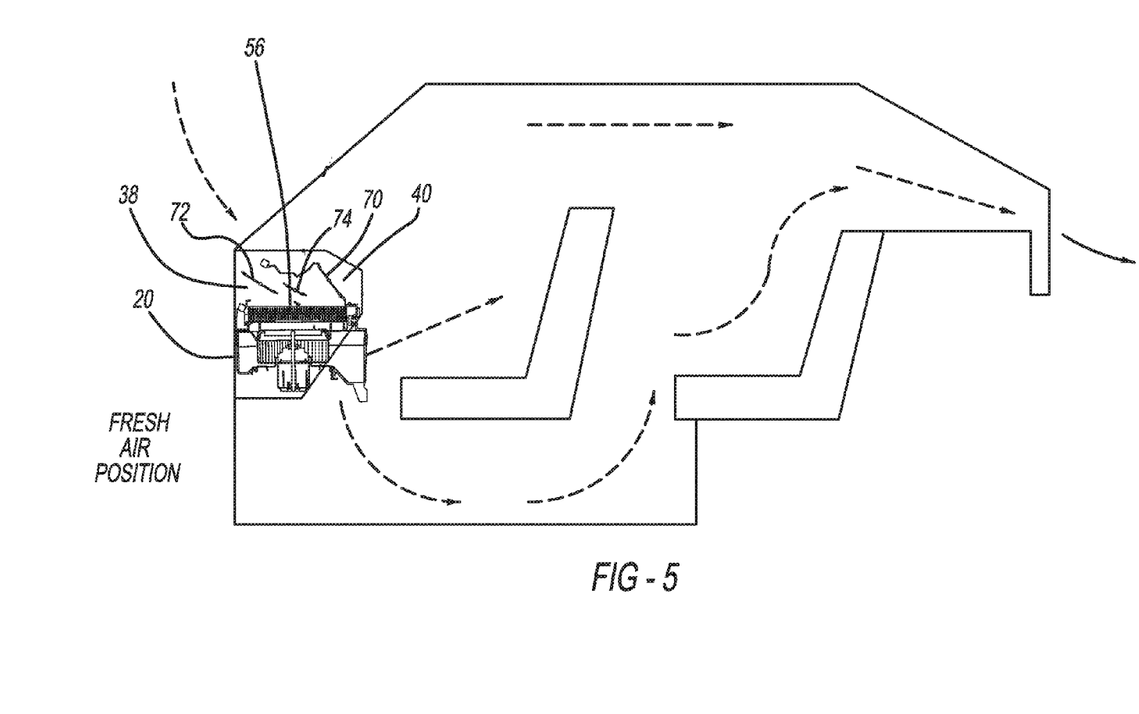
FIG. 5 is a schematic view of a passenger compartment of a vehicle and the blower unit of the HVAC system of FIG. 2 shown in a "FRESH AIR" position.
Figure 6:
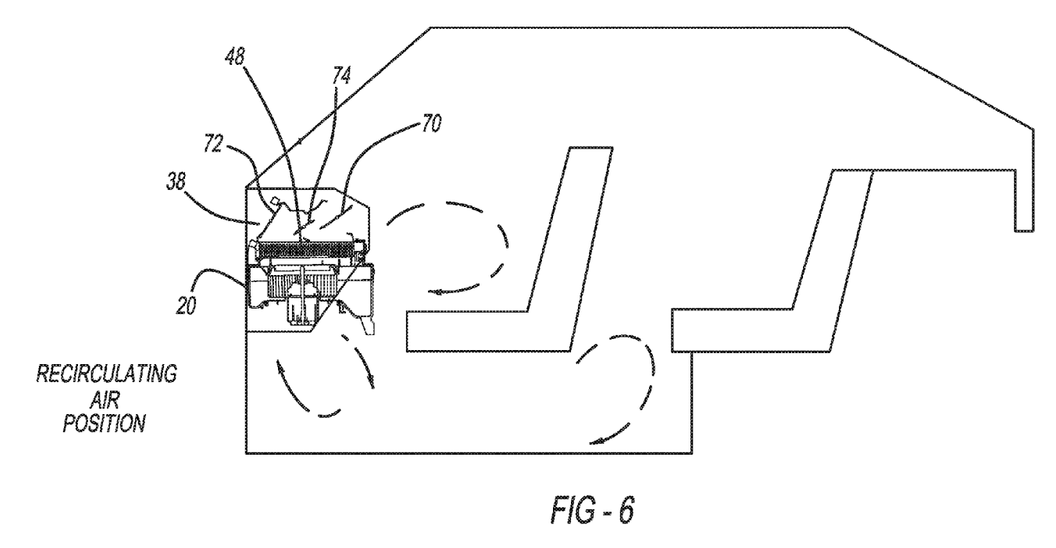
FIG. 6 is a schematic view of a passenger compartment of a vehicle and the blower unit of the HVAC system of FIG. 2 shown in a "RECIRCULATING AIR" position.
Figure 7:
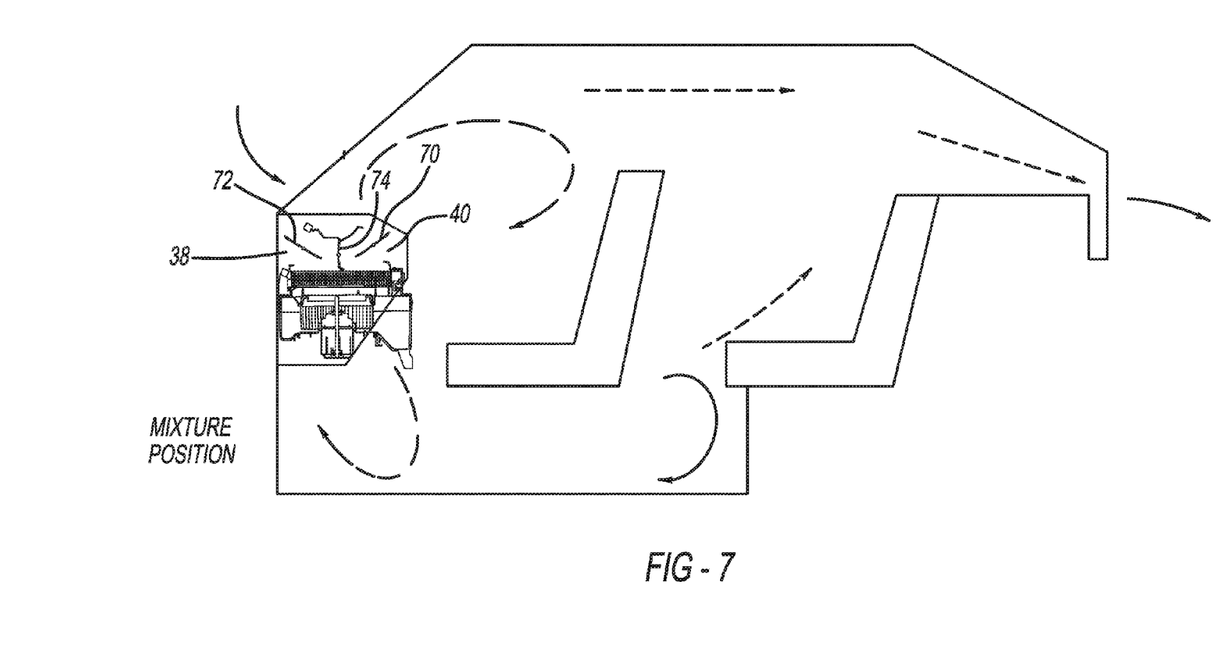
FIG. 7 is a schematic view of a passenger compartment of a vehicle and the blower unit of the HVAC system of FIG. 2 shown in a "MIXTURE" position.

The first, second and third doors 70, 72, 74 can be moved between a fresh air position (FIG. 5), a recirculating air position (FIG. 6), and a mixture position (FIG. 7). In the fresh air position, the second door 72 obstructs the interior air intake aperture 38 and the first door 70 fully opens the exterior air intake aperture 40. More specifically, the second door 72 is disposed against the upper case member 32 such that the compressible members 84a, 84b deform to create seals at the periphery of the interior air intake aperture 38. In addition, the first door 70 is disposed in a central region of exterior air intake aperture 40 to fully open exterior air intake aperture 40. Third door 74 is disposed generally parallel with first door 70 such that air entering exterior air intake aperture 40 has full access to lower opening 42 of upper case member 32. As such, air is able to enter the blower unit 30 through the exterior air intake aperture 40, and air is unlikely to enter the blower unit 30 through the interior air intake aperture 38. More specifically, air is able to enter the blower unit 30 through the exterior air intake aperture 40 and flow on both sides of the first and third doors 70, 74, through the filter 56, through the bellmouth member 34, through the lower case member 36, and out of the blower unit 30 through the exhaust chamber 54. In this manner, the exterior air introduced into the interior of the vehicle 10 will be fresh, and thus enjoyable for passenger breathing comfort.

When the first, second and third doors 70, 72, 74 are in the recirculating air position (FIG. 6), the first door 70 is sealed against the upper case member 32 to fully obstruct the exterior air intake aperture 40. More specifically, the first door 70 abuts against the upper case member 32, which deforms the compressible members 78a, 78b of the first door 70 to thereby create seals with upper case member 32 at the periphery of the exterior air intake aperture 40. In addition, the second door 72 is disposed in a central region of interior air intake aperture 38 to fully open interior air intake aperture 38. Third door 74 is disposed generally parallel with second door 72 such that air entering interior air intake aperture 38 has full access to lower opening 42 of upper case member 32. As such, when the first, second and third doors 70, 72, 74 are in the recirculating air position, air is able to enter the blower unit 30 through the interior air intake aperture 38, flow through the filter 56, through the bellmouth and lower case members 34, 36, and out of the blower unit 30 through the exhaust chamber 54. It will be appreciated that when the first, second and third doors 70, 72, 74 are in the recirculating air position, the HVAC unit 16 can operate more efficiently to thereby conserve fuel.

When the first, second and third doors 70, 72, 74 are in the mixture position (FIG. 7), the third door 74 fully obstructs the air passage 94 which extends between the exterior air intake aperture 40 and the interior air intake aperture 38 by sealing against the upper case member 32 and the sealing member 60. More specifically, the third door 74 abuts against the sealing member 60 and the upper case member 32, which deforms the compressible members 90a, 90b to thereby create a seal. The second door 72 is disposed in a central region of interior air intake aperture 38 and the first door 70 is disposed in a central region of exterior air intake aperture 40. As such, air is able to enter the blower unit 30 through both the exterior air intake aperture 40 and the interior air intake aperture 38. Then the air flows through the filter 56, through the bellmouth member 34, through the lower case member 36, and out of the blower unit 30 through the exhaust chamber 54.

It will be appreciated that the third door 74, the sealing member 60 and the upper case member 32 cooperate to prohibit airflow through the air passage 94 because the third door 74 is sealed against the sealing member 60 and the upper case member 32. In one embodiment, the third door 74, the sealing member 60, the upper case member 32, and the compressible members 90a, 90b prevent substantially all airflow through the air passage 94. In addition, a wall 96 which is a part of bellmouth member 34 also prohibits airflow out of the blower unit through the interior air intake aperture 38. As such, air is unlikely to leak into the passenger compartment 14 from the exterior space 20 around the vehicle 10 without first being heated or cooled by the HVAC unit 16. This leakage from the exterior space 20 into the passenger compartment 14 can create passenger discomfort such as cold outside air blowing on a passenger's lower body. This, in turn, causes the HVAC unit 16 to work more efficiently and conserve fuel for the vehicle 10.

Figure 8:
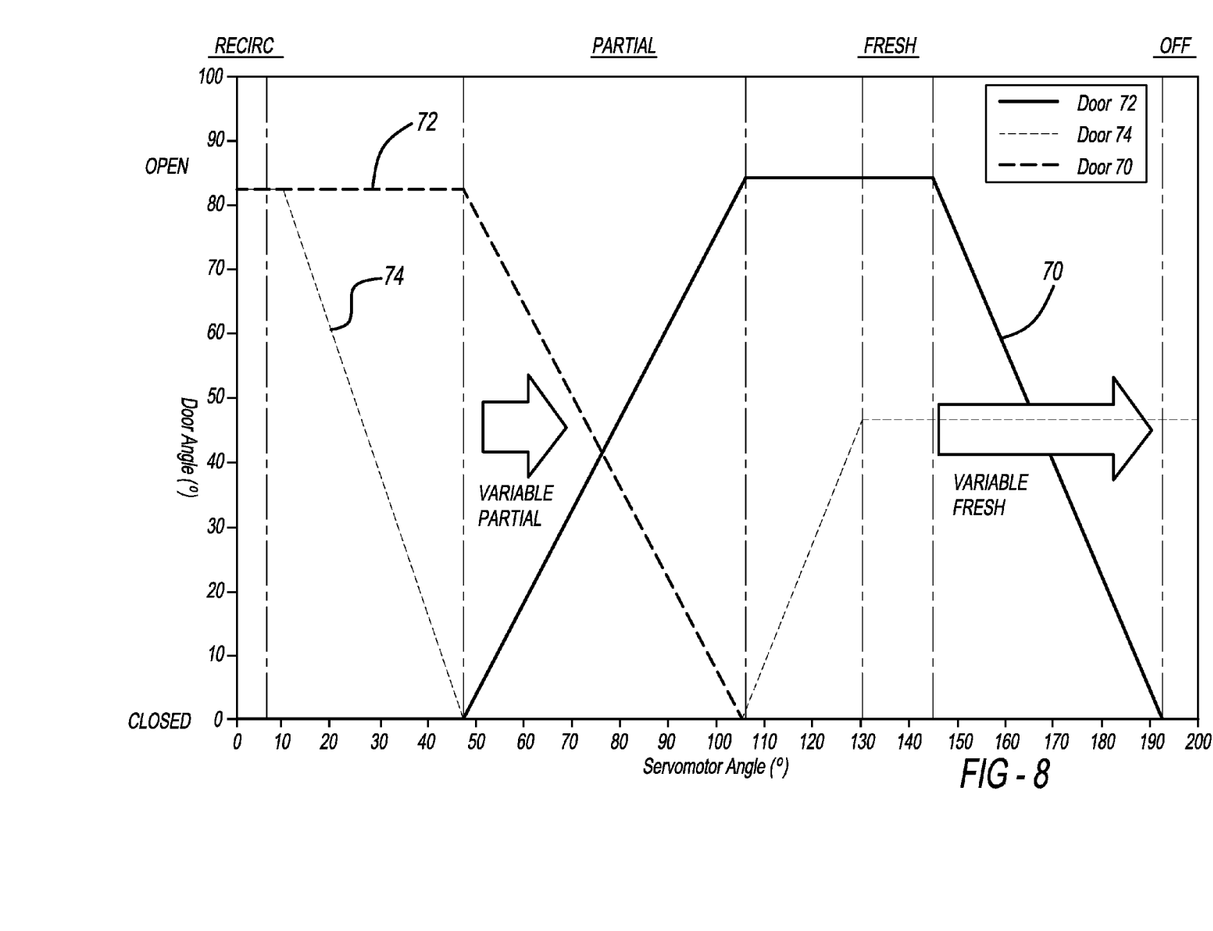
FIG. 8 is a graph showing the movement of the door of the HVAC system in relation to one another.

Referring now to FIG. 8, the relationship between the three butterfly doors 70, 72, 74 is illustrated. The relationship between the position of the three butterfly doors 70, 72, 74 is illustrated in relation to the rotational angle of a servomotor (not shown). It is to be understood that the servomotor operates a linkage assembly (not shown) that controls the rotation of the three butterfly doors 70, 72, 74. In FIG. 8, the door angle for doors 70, 72 of zero degrees is the condition where the door fully closes the opening and the eighty to ninety degree door angle indicates that the door fully opens the opening. For door 72, the opening is interior air intake aperture 38 and for door 70 the opening is exterior air intake aperture 40. For door 74, the opening is air passage 94 and the angle of approximately ninety degrees (shown for recirculation mode) is when door 74 is parallel with door 72 when door 72 fully opens interior air intake aperture 38. This is defined as a first open position. The angle of approximately forty-five degrees (shown in fresh mode) is when door 74 is parallel with door 70 when door 70 fully opens exterior air intake aperture 40. This is defined as a second open position. The closed position of door 74 is when door 74 is between the first open position and the second open position to block air passage 94 and is an angle of zero degrees.

A variable partial mode is defined between the recirculation mode and the partial recirculation mode when the door 74 moves to its closed position and the door 70 moves between the closed and open positions. A variable fresh mode is defined between the fresh mode and an off mode when the door 70 moves from its open position to its closed position as the door 72 remains closed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, ventilation and air conditioning system comprising:
    a case defining an exterior air intake aperture and an interior air intake aperture;
    a first door rotatably attached to the case, the first door movable between an open position where the interior air intake aperture is open and a closed position where the interior air intake aperture is closed; and
    a second door rotatably attached to the case, the second door movable between an open position where the exterior air intake aperture is open and a closed position where the exterior air intake aperture is closed; and
    a third door rotatably attached to the case, the third door movable between an open position where an air passage between the exterior air intake aperture and the interior air intake aperture is open and a closed position where the air passage is closed;
    wherein:
        the heating, ventilation and air conditioning system defines a recirculation mode when the first door is in the open position, the second door is in the closed position, and the third door is in the open position;
        the heating, ventilation and air conditioning system defines a fresh mode when the first door is in the closed position, the second door is in the open position, and the third door is in the open position;
        the heating, ventilation and air conditioning system defines a partial recirculation mode when the first door is in the open position, the second door is in the open position, and the third door is in the closed position;
        the heating, ventilation and air conditioning system defines a variable partial mode between the recirculation mode and the partial recirculation mode; and
        the heating, ventilation and air conditioning system defines a variable fresh mode between the fresh mode and an off position.

2. The heating, ventilation and air condition system according to claim 1, wherein in the open position, the third door is parallel to the first door when the first door is in the open position.

3. The heating, ventilation and air condition system according to claim 1, wherein in the open position, the third door is parallel to the second door when the second door is in the open position.

4. The heating, ventilation and air condition system according to claim 1, wherein the third door is parallel with the first door when both doors are in the open position.

5. The heating, ventilation and air condition system according to claim 1, wherein the third door is parallel with the second door when both doors are in the open position.

6. The heating, ventilation and air conditioning system according to claim 1, wherein the third door blocks airflow from the exterior air intake aperture to the intake air intake aperture when the first door is in the closed position in the partial recirculation mode.

7. The heating, ventilation and air condition system according to claim 1, wherein each of the first door, the second door and the third door is a butterfly door.

8. The heating, ventilation and air conditioning system according to claim 1, wherein the third door blocks airflow from the exterior air intake aperture to the intake air intake aperture when the first door is in the closed position.

* * * * *